United States Patent [19]

Resta et al.

[11] Patent Number: 5,145,144
[45] Date of Patent: Sep. 8, 1992

[54] APPARATUS FOR MOVING WORKING UNITS ALONG PATHS

[75] Inventors: Rodolfo Resta; Mario Resta; Roberto Resta, all of Faenza, Italy

[73] Assignee: RESTA S.r.l., Faenza, Italy

[21] Appl. No.: 666,973

[22] Filed: Mar. 11, 1991

[30] Foreign Application Priority Data

Mar. 20, 1990 [IT] Italy .................. 3397 A/90

[51] Int. Cl.⁵ .................................. F16M 13/00
[52] U.S. Cl. .......................... 248/637; 248/913
[58] Field of Search ............ 248/637, 646, 651, 657, 248/913; 269/73, 71

[56] References Cited

U.S. PATENT DOCUMENTS

| | | | |
|---|---|---|---|
| 2,599,170 | 6/1952 | Franks | 248/646 |
| 2,743,747 | 5/1956 | Franks | 248/657 X |
| 3,801,090 | 4/1974 | Gillen | 248/913 X |
| 4,013,280 | 3/1977 | Chitayat et al. | 248/913 X |
| 4,233,740 | 11/1980 | Bunn et al. | 248/913 X |
| 4,548,115 | 10/1985 | Martin et al. | 269/73 X |
| 4,557,206 | 12/1985 | Iwase . | |
| 4,566,325 | 1/1986 | Rante | 269/73 X |
| 5,010,564 | 4/1991 | Thomas | 269/71 X |
| 5,022,619 | 6/1991 | Mamada | 248/913 X |
| 5,040,431 | 8/1991 | Sakino et al. | 248/913 X |

FOREIGN PATENT DOCUMENTS 320498 6/1989 European Pat. Off. .
1426309 12/1965 France .
8912019 12/1989 PCT Int'l Appl. .

Primary Examiner—David M. Purol
Attorney, Agent, or Firm—Guido Modiano; Albert Josif

[57] ABSTRACT

The apparatus has a supporting frame defined by four uprights bearing a pair of horizontal parallel beams interconnected by cross members having guides. A gearmotor-driven carriage is movable horizontally along the guides in a first direction. The carriage bears rods extending parallel to the guides. A gearmotor-driven trolley is movable along the rods in a second direction which is orthogonal to the first direction. The trolley rotatably supports a downwardly extending C-shaped frame having a platform supporting a working unit. The frame is rotatable about an axis which is perpendicular to the first direction of movement of the carriage and perpendicular to the second direction of movement of the trolley.

6 Claims, 2 Drawing Sheets

APPARATUS FOR MOVING WORKING UNITS ALONG PATHS

BACKGROUND OF THE INVENTION

The present invention relates to an apparatus for moving working units along paths with multiple degrees of freedom.

In the prior art, special machines, such as hemming machines, quilting machines and the like, are used in particular for manufacturing the edges of mattresses, quilts, cloths and the like and for other operations.

A disadvantage of conventional machines is that they cannot be adapted for performing other operations and cannot easily be computerized.

In hemming machines, for example, there is the disadvantage that the working units must be guided around the item to be hemmed. This compels the user to perform awkward operations, and compulsorily requires long operation cycle times.

SUMMARY OF THE INVENTION

The aim of the present invention is therefore to obviate the disadvantages of the known machines.

Within this aim, an object of the invention is to provide a machine which can perform an automated working cycle.

This aim and object, as well as other objects of the invention which will become apparent hereinafter are achieved, by the present apparatus for moving working units along paths with multiple degrees of freedom, characterized in that it comprises a carriage which can move along an axis X and supports a trolley which is guided along said carriage along an axis Y which is orthogonal to said axis X, supporting means being associated with said trolley and supporting a platform, said supporting means being rotatable about an axis Z which is perpendicular to the plane which passes through said axes X and Y, a working unit being mounted on said platform.

BRIEF DESCRIPTION OF THE DRAWINGS

Further characteristics and advantages of the invention will become apparent from the following detailed description of a preferred embodiment of the apparatus, illustrated only by way of non-limitative example in the accompanying drawings, wherein.

DESCRIPTION OF THE PREFERRED EMBODIMENTS

Figure 1:
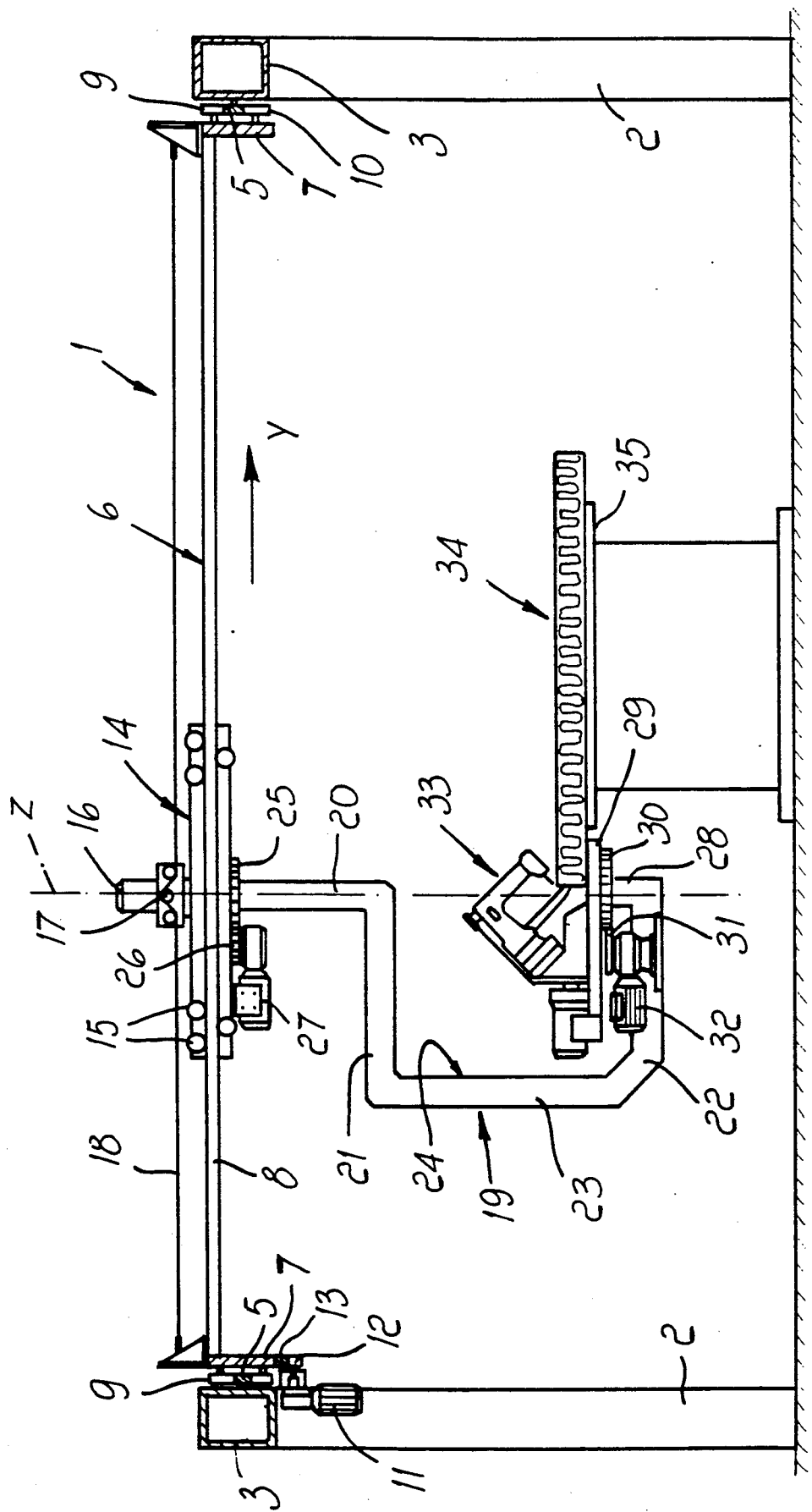
FIG. 1 is a schematic side view of the apparatus according to the invention, with a working unit, constituted by a hemming machine, mounted on a platform.

With reference to the above figures, the reference numeral 1 generally indicates a supporting framework which has four uprights 2 arranged according to the vertices of a rectangle.

Said uprights are connected in pairs by a pair of mutually parallel beams 3 and by a pair of cross-members 4 which are perpendicular to the beams 3.

Guides 5 are arranged along the internal faces of the beams 3 for the sliding of a carriage 6 which is formed by a pair of vertical side walls 7 joined by a pair of parallel rods 8. Wheels 9, 10 are pivotally connected to the side walls 7 and tangentially engage the upper and lower edges of the guides 5.

Figure 2:
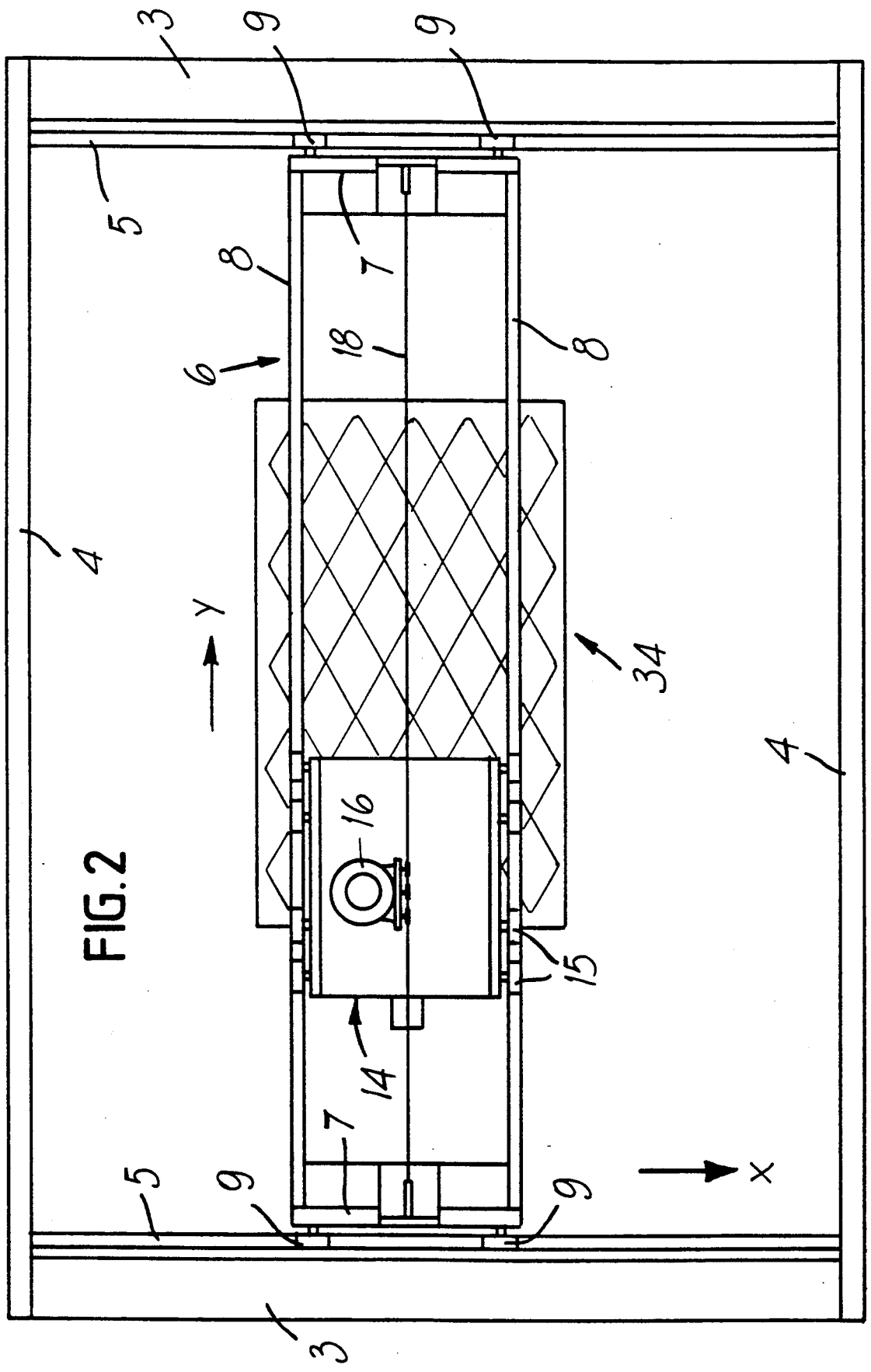
FIG. 2 is a schematic plan view of the apparatus of FIG. 1.

When the carriage 6 is to be moved in a direction of motion along an axis X (see FIG. 2), the sliding of the carriage 6 along the guides 5 is actuated by a gearmotor 11 mounted on one of the beams 2. A pinion 12 is keyed to the output shaft of the gearmotor 11 and meshes with a rack 13 which is rigidly connected to the lower edge of the side wall 7. The rods 8 define sliding guides for a trolley 14 which, by means of wheels 15, slides backwards and forwards along an axis Y, i.e., perpendicular to the axis X.

A gearmotor 16 is mounted on the trolley 14 and actuates a pinion 17 in mesh engagement with a chain 18 which extends between the side walls 7. The chain 18 is kept in meshing contact with the pinion 17 by means of a pair of free sprockets arranged laterally to said pinion.

A frame 19, supported on the trolley 14, extends downward and is constituted by a vertical arm 20 provided, in a downward position, with a plurality of curved portions so as to define a C-shaped configuration, formed by a horizontal portion 21 connected to the arm 20 and joined to a second horizontal portion 22 by means of a vertical portion 23. The portions 21, 23 and 22 therefore define a loop 24. A gearwheel 25 is keyed to the upper end of the arm 20 and meshes with a pinion 26 actuated by a gearmotor 27 which is mounted on the lower face of the trolley 14 so that the whole frame 19 can rotate about an axis Z which is perpendicular to the plane defined by the axes X and Y.

The end of the horizontal portion 22 is curved so as to constitute a support 28 for a horizontal platform 29 which protrudes into the loop 24.

A gearwheel 30 is arranged between the support 28 and the platform 29, and a rotary motion is transmitted thereto by means of a further gearwheel 31 which is keyed on the output shaft of a gearmotor 32, so that the platform 29 performs a rotary motion, about an axis which does not necessarily coincide with the axis Z.

A working unit 33, chosen according to the type of work required, is located on the platform 29.

Said working unit may be constituted by a hemming machine, a glueing machine, a cutter-overcaster, a clincher, a quilting machine and so forth.

The item being worked, which is indicated by the reference numeral 34 and is constituted by a mattress in the specific case, is placed on a work table 35 at the preset height.

The strokes of the carriage 6 and of the trolley 14 are adjusted along the axes X, Y according to the planar dimensions of the item, whereas the frame 19 is rotated about the axis Z to perform the angle stitches according to the preset radius of curvature.

As can be seen, the apparatus according to the invention can be adapted to various work operations and is very easy to operate and structurally simple.

We claim:

1. Apparatus for moving working units along paths with multiple degrees of freedom, comprising a carriage which can move along an axis X and which supports a trolley guided along said carriage along an axis Y which is orthogonal to said axis X, supporting means being associated with said trolley and supporting a platform, said supporting means being rotatable about an axis Z which is perpendicular to the plane which passes through said axes X and Y, a working unit being mounted on said platform, wherein said supporting means comprise a frame which descends vertically and which comprises a vertical arm which extends with a plurality of portions which are curved so as to form a C-shaped loop the end whereof constitutes a support for said platform, a gearwheel being keyed on said arm, said gearwheel meshing with a pinion which is actuated by a gearmotor mounted on said trolley.

2. Apparatus according to claim 1, comprising a framework having four vertical uprights which are mutually connected in pairs by two parallel beams and by two cross-members which are perpendicular to said beams, horizontal guides being mounted along said beams for the sliding support of said carriage, said carriage being actuated by means of a gearmotor.

3. Apparatus according to claim 2, wherein said carriage comprises two side walls on which pairs of wheels are protrudingly mounted, said wheels engaging said guides, said trolley being slidably supported on said carriage in a direction which is perpendicular to that of said carriage.

4. Apparatus according to claim 3, wherein said trolley is constituted by a frame provided with pairs of wheels for sliding on said carriage, said trolley being actuated by means of a gearmotor which actuates a pinion which meshes with a chain which extends between said side walls.

5. Apparatus according to claim 1, wherein said platform is rotatable about the axis Z of rotation of said frame, causing the rotation of said working unit about an axis which is parallel to the axis Z, gearwheels being interposed between said platform and said support, said gears transmitting the rotary motion to said platform from a gearmotor mounted on said frame.

6. Apparatus according to claim 1, wherein said platform is rotatable about the axis Z, said working unit being arranged on said platform so that the axis of rotation of said platform coincides with the working axis of said working unit.

* * * * *